H. E. MARTIN.
SANITARY FLYTRAP.
APPLICATION FILED APR. 14, 1920.

1,373,441.

Patented Apr. 5, 1921.
2 SHEETS—SHEET 1.

WITNESSES.
Frances French
Bertha French

INVENTOR.
HUGH. E. MARTIN.
BY Charles. Albert French.
ATTORNEY.

H. E. MARTIN.
SANITARY FLYTRAP.
APPLICATION FILED APR. 14, 1920.

1,373,441.

Patented Apr. 5, 1921.
2 SHEETS—SHEET 2.

WITNESSES.
Frances French
Bertha French

INVENTOR.
HUGH. E. MARTIN.
BY Charles. Albert French
ATTORNEY.

UNITED STATES PATENT OFFICE.

HUGH E. MARTIN, OF MADISON, WISCONSIN.

SANITARY FLYTRAP.

1,373,441. Specification of Letters Patent. Patented Apr. 5, 1921.

Application filed April 14, 1920. Serial No. 373,903.

*To all whom it may concern:*

Be it known that I, HUGH E. MARTIN, a citizen of the United States, residing at Madison, in the county of Dane and State of Wisconsin, have invented certain new and useful Improvements in Sanitary Flytraps, of which the following is a specification.

My invention relates to a sanitary and efficient means for capturing and destroying the house fly; and the objects of my invention are, first, to construct a device that can be secured to the top and outside of a screen door, and admit the flies through three openings into the trap, outside of the door, and two openings from the inside of the door; second, to be able to remove dead flies from the trap without allowing any live flies to escape; and, third, to prevent the live flies from mingling with the dead ones.

I attain these objects by the mechanism shown in the accompanying drawings in which—

Similar numerals refer to similar parts throughout the several views.

Figure 1:
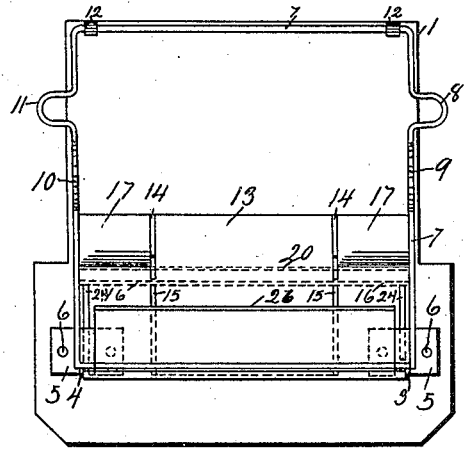
Figure 1, is a front elevation, without screen casing.
Figure 2:
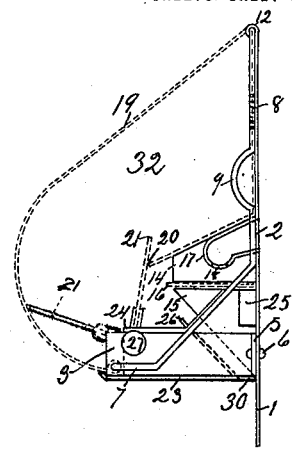
Fig. 2, is a right side elevation, without screen casing.
Figure 3:
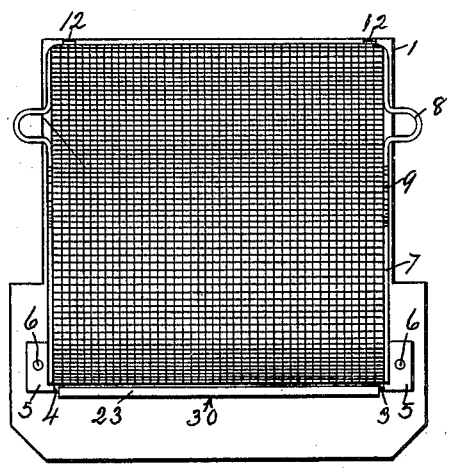
Fig. 3, is a front elevation complete.
Figure 4:
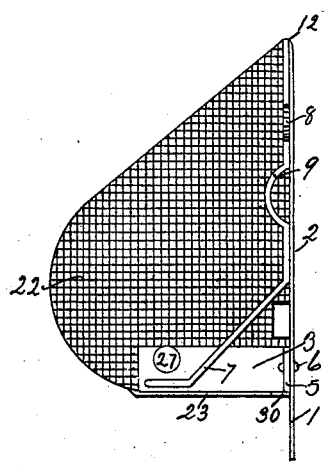
Fig. 4, is a right side elevation complete.
Figure 5:
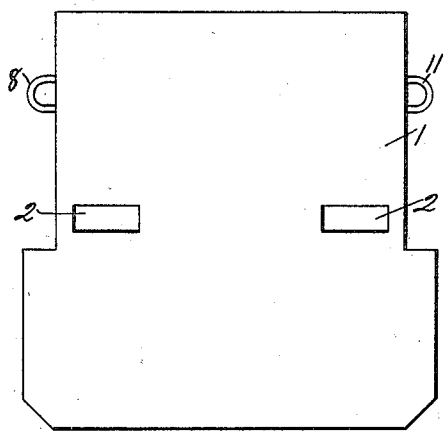
Fig. 5, is a rear elevation.
Figure 6:
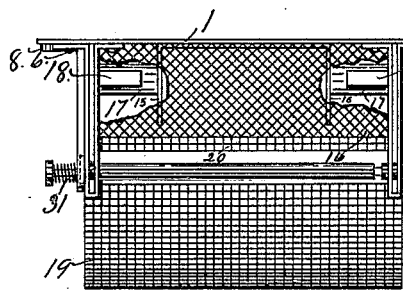
Fig. 6, is a view of bottom with pan removed.
Figures 7, 8:
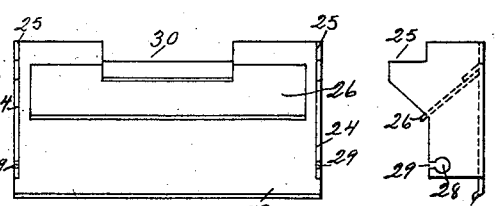
Fig. 7, is a plan of the pan.
Fig. 8, is a side elevation of the pan.

The back plate 1, preferably of sheet tin of approximately the form shown in Figs. 1 and 5, with the holes 2, is located intermediate the vertical dimensions and adjacent the sides. Brackets 3 and 4 are formed by bending a strip of metal backward upon itself and the two portions spaced apart approximately the thickness of the metal then both portions are bent outward at right angles forming a base 5, said brackets are located on the front a distance above the bottom and adjacent the sides of the back plate and are secured thereto by rivets 6, or by any practical means. A wire frame 7 commencing at the center extends across the top to the right, then downward at the side, curving outward a distance down forming loop 8, then forward forming arch 9, and a distance below the arch, depends forward to near the front end of the bracket 3, then at right angles through the bracket to the left, then through the bracket 4, then backward and upward, forming arch 10, and loop 11, to the place of beginning. The ends of said frame are secured in alinement by the back plate 1, being rolled over them at the top 12, a plate 13 of sheet metal is disposed on the back and turned forward at both ends and separated a distance down from the top, forming partitions 14 and 15, and adapted to receive a removable wire screen shelf 16, between them, said shelf extends the entire width of the frame. Metal shields 17, extend from the partitions 14, to the outside of the frame, forming two compartments with openings 18, in their bottoms and covering from the front the holes 2, in the back plate. A wire screen casing 19, is secured at the bottom around the frame 7, thence curved forward and upward to 12, on the back plate, thence down in front of the plate to partitions 14, and terminating slightly in front of the same. At 20, a swinging wire door 21, is pivotally located at the top and front ends of the brackets 3 and 4 which is adapted to close the space between the front edge of the screen at 20, and the lower end of the screen 19, where it is fastened to the frame 7, and is in near contact with the screen ends 22, of the trap thus forming a closed compartment when the bottom pan 23, hereinafter described, is in position. The pan 23, is a removable metal plate covering the bottom of the device from the back plate 1, to the front line of the wire frame 7, and is secured to the same by the two ends 24 which are disposed between the members of the brackets 3 and 4, and is further secured by a rod 27, which is also the hinge for the wire door 21. The pan is turned upward at both ends and is provided with round holes 28, and with slots 29, extending to the top of the plate. A portion at 25, is removed from the upper back corners, said portion registering with holes through the end screen covering of the device. A wall 26 extends approximately the entire length of the pan, a distance from the rear edge equal to the width of gap 30, and following the lower edge of bracket 15, and terminating a distance below the wire shelf 16.

The pan is attached by pulling the rod 27, and inserting the sides 24 between the members of the brackets 3 and 4 and pressed upward until the holes 28 register with corresponding holes through the brackets, and the rod 27 being reduced to a thin plate a distance from the ends to permit the slots 29, to pass, and by releasing the rod which is spring actuated at 31, the round portions fill the holes below the slots and prevent the pan dropping down.

As can be seen by reference to the drawings, when the pan is in place and door 21 is turned back against the screen 19, two openings 25 admit flies at the sides of the device, and they can pass between partition 15, and the sides 24, into the main cage 32, and another entrance is through gap 30, in the bottom of the pan over wall 26, and under shelf 16, to the cage 32. Two more entrances are through holes 2, in the back plate 1 from the inside of the door to the bottom of the shields 17, and out through holes 18 onto the top of screen shelf 16, and under the screen at 20, into the cage 32, thereby providing five entrances to the cage or trap. When the flies die and drop down onto the pan 23, in sufficient numbers to be removed, swinging door 21 is swung backward against the shelf at 20, thus closing the cage so the bottom pan may be removed by pulling the rod 27, as aforesaid.

Having thus described my invention, I claim:

In a device for catching flies, a back plate, a wire frame attached to the same, brackets secured to the back and frame, a cage formed by wire screen secured to the back and frame, a detachable bottom pan, and means for closing the cage when the bottom is removed, separate entrances for flies to enter the cage, all of them concealed from view of the cage.

In testimony whereof I affix my signature in the presence of two subscribing witnesses.

HUGH E. MARTIN.

Witnesses:
FRANK J. OWENS,
CARTER H. MARTIN.